United States Patent
Scharp

(10) Patent No.: US 7,685,710 B2
(45) Date of Patent: Mar. 30, 2010

(54) METHOD FOR PRODUCING A PISTON FOR AN INTERNAL COMBUSTION ENGINE

(75) Inventor: Rainer Scharp, Vaihingen (DE)

(73) Assignee: Mahle GmbH, Stuttgart (DE)

( * ) Notice: Subject to any disclaimer, the term of this patent is extended or adjusted under 35 U.S.C. 154(b) by 612 days.

(21) Appl. No.: 10/578,595

(22) PCT Filed: Oct. 30, 2004

(86) PCT No.: PCT/DE2004/002416

§ 371 (c)(1),
(2), (4) Date: May 25, 2006

(87) PCT Pub. No.: WO2005/046929

PCT Pub. Date: May 26, 2005

(65) Prior Publication Data

US 2007/0107215 A1    May 17, 2007

(30) Foreign Application Priority Data

Nov. 8, 2003    (DE) ................ 103 52 244

(51) Int. Cl.
B21K 1/18    (2006.01)
B23P 15/08    (2006.01)

(52) U.S. Cl. .................... 29/888.045; 29/888.044; 29/888.042; 29/888.04; 29/888.07

(58) Field of Classification Search ......... 29/888.01, 29/888.04, 888.042, 888.044, 888.045, 888.07
See application file for complete search history.

(56) References Cited

U.S. PATENT DOCUMENTS

| | | | |
|---|---|---|---|
| 4,651,631 A | | 3/1987 | Avezou et al. |
| 4,696,224 A | * | 9/1987 | Mishima ............ 92/187 |
| 5,524,696 A | * | 6/1996 | Osborne et al. ........ 164/34 |
| 5,645,028 A | * | 7/1997 | Matsuoka et al. ...... 123/276 |
| 5,903,974 A | * | 5/1999 | Nakajima ......... 29/888.049 |
| 6,029,346 A | * | 2/2000 | Chellappa .......... 29/888.04 |
| 6,279,455 B1 | * | 8/2001 | Kruse ................ 92/186 |
| 6,530,149 B2 | * | 3/2003 | Sugiura et al. ...... 29/888.042 |
| 6,820,582 B1 | * | 11/2004 | Gabriel et al. ....... 123/193.6 |
| 6,837,298 B2 | * | 1/2005 | Ruhle ............... 164/100 |
| 6,892,689 B2 | * | 5/2005 | Bischofberger et al. .. 123/193.6 |
| 2001/0022134 A1 | * | 9/2001 | Sugiura et al. .......... 92/172 |

FOREIGN PATENT DOCUMENTS

| | | |
|---|---|---|
| CH | 374 855 A | 1/1964 |
| DE | 23 48 726 | 4/1975 |
| DE | 143 372 A | 6/1980 |

(Continued)

OTHER PUBLICATIONS

International Search Report.

*Primary Examiner*—David P Bryant
*Assistant Examiner*—Sarang Afzali
(74) *Attorney, Agent, or Firm*—Collard & Roe, P.C.

(57) ABSTRACT

The invention relates to a method for producing a piston (1) for an internal combustion engine. The inventive method comprises producing the base (4) from aluminum by a forging process, casting, by way of a composite casting process, a ring support (10) which is provided with a cooling channel (15) into an aluminum ring element (6), and then welding the ring element (6) with the base (4).

1 Claim, 3 Drawing Sheets

FOREIGN PATENT DOCUMENTS

| | | |
|---|---|---|
| DE | 279 203 A1 | 5/1990 |
| DE | 197 22 053 A1 | 12/1998 |
| FR | 1 244 722 A | 10/1960 |
| GB | 2035448 A * | 6/1980 |
| JP | 05 240347 A | 9/1993 |

* cited by examiner

METHOD FOR PRODUCING A PISTON FOR AN INTERNAL COMBUSTION ENGINE

CROSS REFERENCE TO RELATED APPLICATIONS

Applicant claims priority under 35 U.S.C. §119 of German Application No. 103 52 244.1 filed Nov. 8, 2003. Applicant also claims priority under 35 U.S.C. §365 of PCT/DE2004/002416 filed Oct. 30, 2004. The international application under PCT article 21(2) was not published in English.

BACKGROUND

The invention relates to a method for producing a piston for an internal combustion engine, in accordance with the preamble of the claim.

From the patent DD 142 372, it is known to produce a piston that consists of aluminum, in that an aluminum base body and furthermore a ring element made of aluminum, for reinforcing the piston edge region, are produced in a casting method. In this connection, a recess for a cooling channel is worked into the ring element. Subsequent to this, a steel ring is welded onto the base body, after which the ring element is welded onto the base body provided with the steel ring. In a last work step, a piston ring groove for a compression ring is formed in the steel ring. The complexity of the production method is a disadvantage here.

SUMMARY

It is the task of the invention to avoid this disadvantage of the state of the art. This task is accomplished with the characteristics contained in the characterizing part of the claim.

A significant simplification of the method for producing an aluminum piston results from the fact that the ring element is produced using the composite casting method, whereby a ring insert having a formed-on cooling channel is cast into the ring element.

BRIEF DESCRIPTION OF THE DRAWINGS

An exemplary embodiment of the invention will be described in the following, using the drawings. These show FIG. 1 a piston for an internal combustion engine, having an aluminum ring element according to the invention, in a sectional diagram that consists of two halves, and shows two longitudinal sections of the piston, offset by 90°, and FIG. 2 an enlarged representation of the section through the edge region of the piston crown with the ring element.

DETAILED DESCRIPTION

Figure 1:
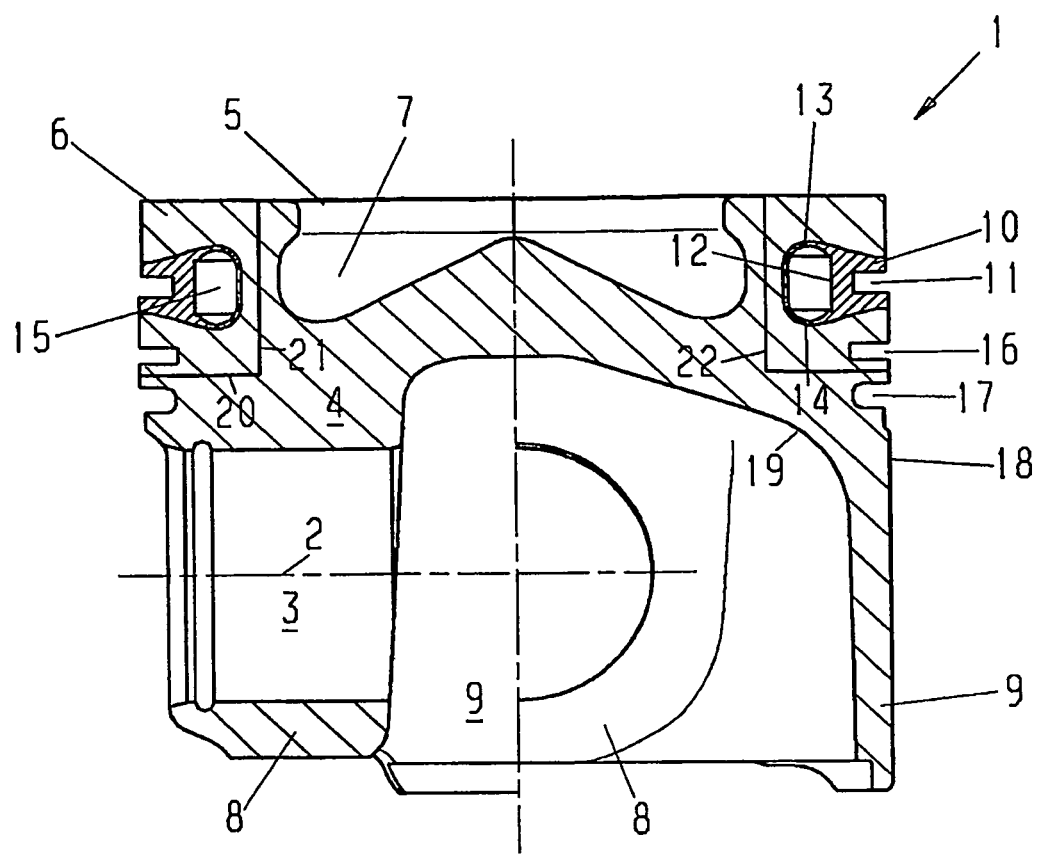

FIG. 1 shows a piston 1 for an internal combustion engine, in a sectional diagram that consists of two halves, of which the left half shows a section of the piston 1 along a longitudinal axis 2 of a pin bore 3, and the right half shows a section through the piston 1 offset by 90° relative to the former.

The piston 1 consists of an essentially cylindrical base body 4, the one face surface of which forms the piston crown 5. In the present exemplary embodiment, a recess 22 that is rectangular in cross-section has been formed into the radially outer region of the piston crown 5, and a ring element 6 is fitted into it. A combustion chamber 7 is disposed in the central region of the piston crown 5. Furthermore, the base body 4 has pin bosses 8 for the pin bores 3, and skirt elements 9 that connect the pin bosses 8 with one another, on its underside that faces away from the piston crown 5. The ring element 6 has a ring insert 10 having a ring groove 11 for a compression ring, not shown in the figure.

The free shanks 13, 14 of an essentially toroid-shaped cooling channel 15 that is C-shaped in cross-section and radially open to the outside, which is made from sheet steel, are welded onto the radially inner cylindrical surface 12 of the ring insert 10 that consists of NiResist. Cooling oil can be passed into the cooling channel 15 and then out again by way of inflow and outflow openings between the cooling channel 15 and the piston inside 19, which openings are not shown in the figure.

Furthermore, a further ring groove 16 is formed into the ring element 6, following the ring insert 10 in the direction of the skirt elements 9. An oil ring groove 17 is disposed close to the ring element 6, in the mantle surface 18 of the base body 4.

Both the base body 4 and the ring element 6 consist of aluminum, whereby the base body 4 is given the desired shape by means of forging, whereas the ring element 6 is produced by means of a casting method. In this connection, the ring insert 10 provided with the cooling channel 15 is cast into the ring element 6, using the composite casting method. In a further work step, the base body 4 and the ring element 6 are welded to one another, whereby preferably, the electron beam welding method is used. In this connection, a weld seam 20 that lies in the radial direction, and a weld seam 21 that is disposed in the axial direction are obtained according to the present exemplary embodiment. In a last work step, the piston 1 is given its final shape by means of a cutting production method, such as lathing, for example.

Figure 2:
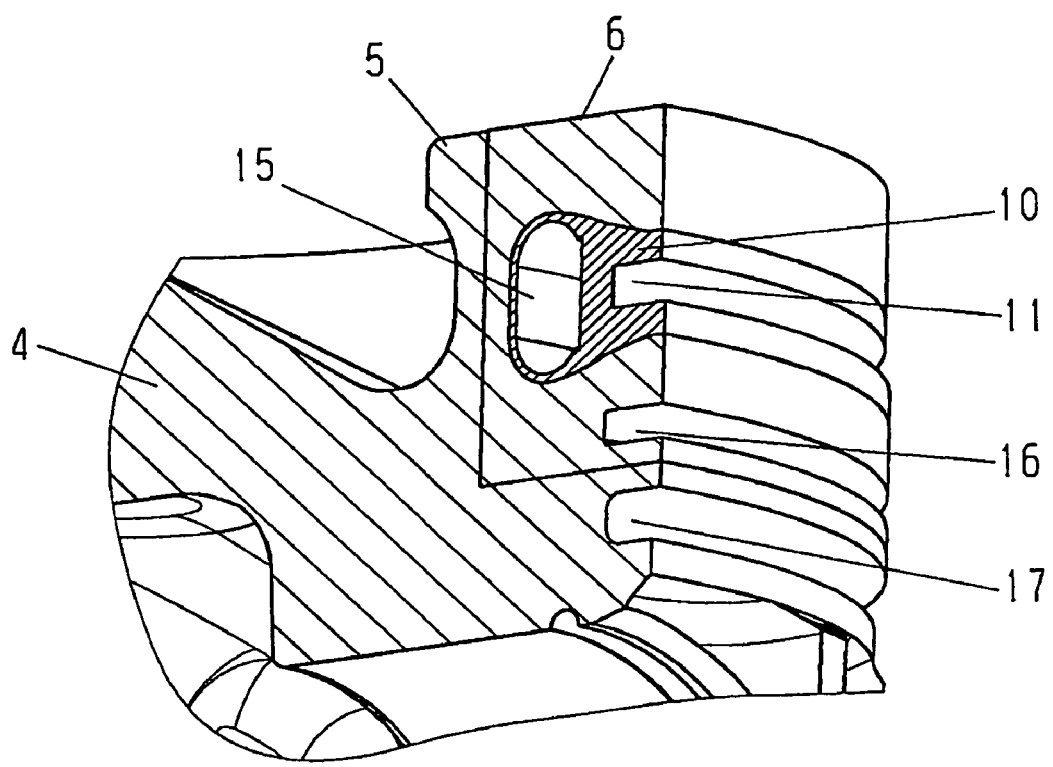

The enlarged sectional diagram of the edge region of the piston crown 5 shown in FIG. 2 shows the ring element 6, which consists of aluminum, with the cooled ring insert 10 cast into it, which has the ring groove 11 for a sealing ring on its radial outside, and the cooling channel 15 on its radial inside. The ring groove 16 that is situated in the ring element 6, and the oil ring groove 17 formed into the base body 4, can also be seen well.

Figure 3:
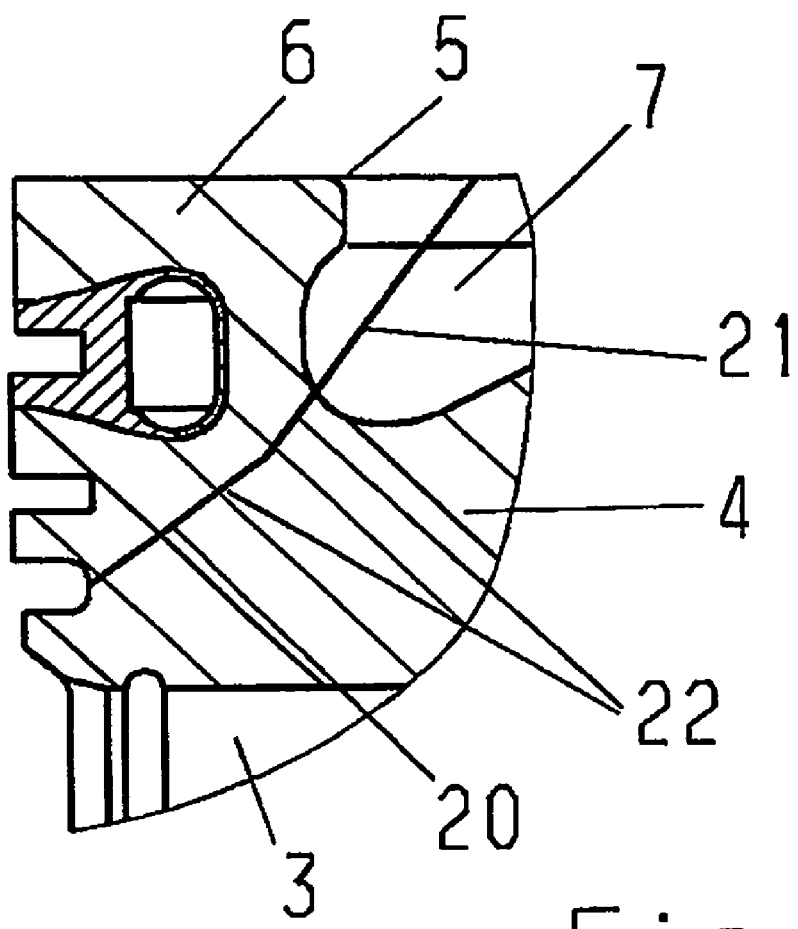
FIG. 3 Another embodiment illustrating an enlarged representation of the section through the edge region of the piston crown with ring element including an inclined weld seam.

According to other exemplary embodiments of the invention, shown as examples in FIG. 3, the recess 22 can be formed in such a manner that the circumferential weld seam 21 is inclined towards the longitudinal piston axis, and narrows conically towards the piston crown 5, and that the weld seam 20 has a direction that deviates from the radial axis direction, for example towards the pin bore 3.

REFERENCE SYMBOL LIST 1 piston
2 longitudinal axis
3 pin bore
4 base body
5 piston crown
6 ring element
7 combustion chamber
8 pin boss
9 skirt element
10 ring insert
11 ring groove
12 surface of the ring insert 10
13 shank
14 shank 15 cooling channel
16 ring groove
17 oil ring groove
18 mantle surface
19 piston inside
20 weld seam
21 weld seam
22 recess

The invention claimed is:

1. A method for producing a piston for an internal combustion engine, the piston having an essentially cylindrical base body made of aluminum, whose one face forms a piston crown, pin bosses with pin bores disposed on an underside of the base body facing away from the piston crown, and skirt elements that connect the pin bosses with one another, the method comprising the following steps:

produce the base body via forging, so that a recess having a rectangular cross section is formed into a radially outer region of the piston crown;

welding free shanks of an essentially toroid-shaped cooling channel, which is C-shaped in cross-section and radially open to the outside, and produced from sheet steel, onto a cylindrical surface of a ring insert made of NiResist, which surface lies radially on an inside, casting the ring insert provided with the cooling channel into a ring element made of aluminum, using a composite casting method, said ring element having a rectangular cross section such that the ring element fits into the recess;

fitting the ring element containing the ring insert with the cooling channel into the recess and welding the ring element to the base body; and forming the piston into a final shape by means of a cutting production method.

* * * * *